United States Patent
Knezevic et al.

(10) Patent No.: US 12,260,849 B2
(45) Date of Patent: Mar. 25, 2025

(54) METHOD AND DEVICE FOR ACTIVE CONTROL OF VIBRATIONS IN A VEHICLE HAVING A PLURALITY OF ELECTRIC MACHINE UNITS

(71) Applicant: Bayerische Motoren Werke Aktiengesellschaft, Munich (DE)

(72) Inventors: Jovan Knezevic, Munich (DE);
Jean-Baptiste Maurice, Amberg (DE);
Markus Wadepuhl, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 166 days.

(21) Appl. No.: 18/020,122

(22) PCT Filed: Oct. 11, 2021

(86) PCT No.: PCT/EP2021/077980
§ 371 (c)(1),
(2) Date: Feb. 7, 2023

(87) PCT Pub. No.: WO2022/096225
PCT Pub. Date: May 12, 2022

(65) Prior Publication Data
US 2023/0274726 A1    Aug. 31, 2023

(30) Foreign Application Priority Data
Nov. 3, 2020  (DE) .................... 10 2020 128 824.7

(51) Int. Cl.
G10K 11/16    (2006.01)
B60L 15/20    (2006.01)
G10K 11/178   (2006.01)

(52) U.S. Cl.
CPC ........ *G10K 11/17883* (2018.01); *B60L 15/20* (2013.01); *G10K 11/1785* (2018.01);
(Continued)

(58) Field of Classification Search
CPC ......... G10K 11/17883; G10K 11/1785; G10K 2210/1282; B60L 15/20; B60L 2220/42; B60L 2270/14
(Continued)

(56) References Cited

U.S. PATENT DOCUMENTS

2010/0134058 A1   6/2010   Nagashima et al.
2019/0016297 A1   1/2019   Saito
(Continued)

FOREIGN PATENT DOCUMENTS

CN      111817643 A  * 10/2020  ........... G10K 11/175
DE    10 2009 046 166 A1   7/2010
(Continued)

OTHER PUBLICATIONS

International Search Report (PCT/ISA/210) issued in PCT Application No. PCT/EP2021/077980 dated Jan. 19, 2022 with English translation (five (5) pages).
(Continued)

*Primary Examiner* — Ammar T Hamid
(74) *Attorney, Agent, or Firm* — Crowell & Moring LLP (57) ABSTRACT

A device for controlling vibrations generated by electric machines of a vehicle is provided. The vehicle includes a first electric machine unit for driving a first wheel and a second electric machine unit for driving a second wheel. The
(Continued)

device is configured to operate the first electric machine unit depending on a first torque to be applied to the first wheel and to operate the second electric machine unit depending on a second torque to be applied to the second wheel. Furthermore, the device is configured to operate the first electric machine unit and the second electric machine unit in a manner coordinated to one another such that predefined target vibrations can be generated as a result of the superimposition of first vibrations caused by the operation of the first electric machine unit and second vibrations caused by the operation of the second electric machine unit.

11 Claims, 3 Drawing Sheets

(52) U.S. Cl.
CPC ....... *B60L 2220/42* (2013.01); *B60L 2270/14* (2013.01); *G10K 2210/1282* (2013.01)

(58) Field of Classification Search
USPC .............................................. 381/71.9, 71.1
See application file for complete search history.

(56) References Cited

U.S. PATENT DOCUMENTS

2019/0066653 A1    2/2019  Speidel et al.
2020/0118536 A1*   4/2020  Valeri ................ G10K 11/1785

FOREIGN PATENT DOCUMENTS

| DE | 10 2015 122 194 A1 | 6/2017 | |
|----|---|---|---|
| DE | 11 2016 005 495 T5 | 8/2018 | |
| DE | 102018213826 A1 * | 2/2020 | |
| DE | 10 2019 115 825 A1 | 4/2020 | |
| EP | 3293028 A1 * | 3/2018 | ............... A62C 3/07 |
| JP | 2004-312922 A | 11/2004 | |
| JP | 2005-130614 A | 5/2005 | |

OTHER PUBLICATIONS

German-language Written Opinion (PCT/ISA/237) issued in PCT Application No. PCT/EP2021/077980 dated Jan. 19, 2022 (eight (8) pages).

German-language Search Report issued in German Application No. 10 2020 128 824.7 dated Jun. 25, 2021 with partial English translation (13 pages).

\* cited by examiner

METHOD AND DEVICE FOR ACTIVE CONTROL OF VIBRATIONS IN A VEHICLE HAVING A PLURALITY OF ELECTRIC MACHINE UNITS

BACKGROUND AND SUMMARY OF THE INVENTION

The invention relates to a method and a corresponding device for active control of vibrations in a vehicle comprising two or more coupled electric machine units, in particular to reduce or suppress background noise, vibrations and/or electromagnetic radiation in the vehicle.

A vehicle may have a noise cancellation unit. Active noise cancelling (ANC) can be used to reduce, for example, engine noise and/or rolling noise that may be perceived as annoying by a vehicle occupant in the passenger compartment of the vehicle.

The installation of an ANC system in a vehicle is associated with relatively high costs and with additional installation space requirements (in particular for the loudspeakers to be installed). The present document deals with the technical problem of reducing vibrations (in particular background noise and/or structure-borne noise and/or possibly electromagnetic vibrations) in a vehicle operated with a plurality of electric machines in an efficient and reliable manner and/or actively adjusting them to a target vibration.

The problem is solved by the claimed invention. It is noted that additional features of a claim dependent on an independent claim without the features of the independent claim or only in combination with a subset of the features of the independent claim can form an invention in its own right that is independent of the combination of all features of the independent claim and that can be made the subject of an independent claim, a divisional application or a subsequent application. This applies in the same way to technical teachings described in the description, which may form an invention independent of the features of the independent claims.

According to one aspect, a device for controlling vibrations effected by electric machine units of a vehicle is described. The vibrations may include mechanical vibrations, acoustic vibrations, in particular background noise and/or structure-borne noise, and/or electromagnetic vibrations effected by the operation of the electric machine units.

The vehicle may comprise a first electric machine unit for driving a first wheel (for example, the left wheel of an axle) and a second electric machine unit for driving a second wheel (for example, the right wheel of the axle) of the vehicle.

The first electric machine unit may comprise a first electric machine (for driving the first wheel) and a first inverter, wherein the first inverter is set up to generate first AC voltages (in particular for an electromagnetic rotary field) for the operation of the first electric machine (based on a DC voltage).

In a corresponding manner, the second electric machine unit may comprise a second electric machine (for driving the second wheel) and a second inverter, wherein the second inverter is set up to generate second AC voltages (in particular for an electromagnetic rotary field) for operating the second electric machine (based on a DC voltage). The DC voltage for both inverters can be provided from a DC voltage vehicle electrical system (in particular from a high-voltage vehicle electrical system with a nominal voltage of, for example, 60V or more, or 100V or more, or 300V or more).

The first electric machine unit may be set up to generate first vibrations (for example, at the common housing or at a connected housing of the two machine units) during operation and/or by operation of the first electric machine unit. In a corresponding manner, the second electric machine unit may be set up to generate second vibrations (at the common housing or at the connected housing) during operation and/or by operation of the second electric machine unit. The vibrations may be effected here by switching operations of switching elements of the particular inverter and/or by the movement of the rotor and/or by the stator of the particular electric machine.

The first electric machine unit and the second electric machine unit can be mechanically coupled to each other so that the first vibrations and the second vibrations can influence and/or superimpose each other. For example, the first and second electric machine units may be arranged in a common housing (and may be in direct contact with each other if necessary). Alternatively, the housings of the two electric machine units may be connected to each other.

The device can be set up to operate the first electric machine unit in dependence on a first torque to be applied at the first wheel. Furthermore, the device can be set up to operate the second electric machine unit in dependence on a second torque to be applied to the second wheel. The torques can depend here on a specification of the driver of the vehicle (which is specified, for example, via the deflection of the accelerator pedal and/or the brake pedal). The two torques can be different here (for example due to different coefficients of friction between the wheels and the road surface and/or when cornering).

The device can thus be set up to operate the electric machine units for driving the vehicle. The operation of the electric machine units can be carried out here in a coordinated and/or synchronized manner in order to control the vibrations (at the common housing or at the connected housing of the two electric machine units) that are actually and/or in sum effected. In particular, the device can be set up to operate the first electric machine unit and the second electric machine unit in such a coordinated and/or synchronized manner with respect to each other and/or in such a coordinated and/or synchronized manner that predefined target vibrations (at the common housing or at the connected housing) are effected by superimposing the first vibrations caused by the operation of the first electric machine unit and the second vibrations caused by the operation of the second electric machine unit.

The device can thus be set up (taking into account the torque to be established in each case) to operate the electric machine units in a coordinated manner in such a way that predefined target vibrations (on the common housing or on the connected housing) are brought about by the operation of the electric machine units in combination. In this way, active noise and/or vibration reduction can be effected in an efficient and reliable manner. Alternatively or additionally, a design of driving and/or engine noise can thus be effected in an efficient and reliable manner. Alternatively or additionally, EMC requirements can thus be fulfilled in an efficient manner. Furthermore, a reduction of the switching frequency of the switching elements of the inverters can be made possible, whereby the switching losses can be reduced and the service life of the switching elements can be increased.

The device may be set up to access characteristic data (for example in the form of a look-up table) which have been determined in advance. The characteristic data can display control instructions for the operation of the first electric machine unit and for the operation of the second electric machine unit, respectively, in dependence on the first torque and in dependence on the second torque (and possibly in dependence on the first rotational speed of the first electric machine unit and the second rotational speed of the second electric machine unit), wherein the control instructions allow operation of the two machine units with which the predefined target vibrations are brought about. The characteristic data may have been determined experimentally in advance.

Alternatively or additionally, a machine-learned unit, for example with a learned neural network, can be provided and used by the device, wherein the machine-learned unit has been learned to determine (in particular to provide as output values of the neural network) the control instructions for the operation of the first electric machine unit and for the operation of the second electric machine unit in dependence on the first and second torque to be established (and possibly in dependence on the first rotational speed of the first electric machine unit and the second rotational speed of the second electric machine unit).

The device can thus be set up to operate the first electric machine unit and the second electric machine unit in dependence on characteristic data and/or in dependence on a learned neural network. The characteristic data and/or the neural network can be determined and/or learned in advance (experimentally). The characteristic data and/or the neural network can be designed to display, for the first electric machine unit and for the second electric machine unit, control instructions in dependence on the first torque and the second torque, operation of the first electric machine unit and of the second electric machine unit with the target vibrations (at the common housing or at the connected housing) being effected by way of said control instructions.

By using characteristic data and/or a learned neural network, a coordinated operation of the electric machine units can be performed in a robust and reliable manner in order to effect the (actual) target vibrations to be generated during the (driving) operation of the electric machine units.

As already stated above, the electric machine units may be operated in coordinated fashion in order to reduce the magnitude of the total vibrations generated. To this end, the device may be set up to operate the first electric machine unit and the second electric machine unit in a manner synchronized with respect to each other and/or in a coordinated manner such that target vibrations (at the common housing or at the connected housing) are effected which have a lower intensity and/or amplitude than the first vibrations and the second vibrations (in each case in an isolated manner). In particular, the coordinated operation of the electric machine units may be such that the first vibrations and the second vibrations at least partially cancel each other out, and/or such that the first vibrations and the second vibrations are at least partially in phase opposition to each other.

As already explained above, the vibrations may comprise acoustic vibrations, in particular background noise. The device can be set up to operate the first electric machine unit and the second electric machine unit in a synchronized manner with respect to each other and/or in a coordinated manner in such a way that the synchronized operation of the first electric machine unit and of the second electric machine unit effects an active noise suppression of background noise that is effected by the first electric machine unit and by the second electric machine unit. The coordinated operation of the electric machine units can thus be carried out to effect, in an efficient and reliable manner, active noise suppression of the background noise effected by the individual electric machine units.

The device can be set up to operate the first electric machine unit and the second electric machine unit out of phase with each other, in particular in phase opposition, to effect the target vibrations. The electric machine units can thus be operated in such a way that the machine units (in particular the rotary fields for operating the electric machines) have a certain phase difference (for example of) 180° with respect to each other. In this way, it can be reliably effected that the first and second vibrations at least partially compensate each other.

The device can be set up to operate the first inverter and the second inverter in synchronization with respect to each other in such a way that the target vibrations (at the common or at the connected housing) are effected. In particular, the switching operations effected by the switching elements of the first inverter can be (temporally) synchronized with the switching operations effected by the switching elements of the second inverter. For example, the switching operations of the first inverter may have a defined phase shift (for example, of) 180° with respect to the switching operations of the second inverter. Due to the coordinated operation of the inverters, the effective target vibrations (at the common or at the connected housing) can be effected in a particularly reliable manner.

The device can be set up to effect a first PWM (pulse width modulation) actuation of switching elements of the first inverter to generate the first AC voltages for operation of the first electric machine. Further, the device can be set up to effect a second PWM actuation of switching elements of the second inverter to generate the second AC voltages for operation of the second electric machine.

The first PWM actuation and the second PWM actuation can then be synchronized with respect to each other in such a way that the target vibrations are effected. The first PWM actuation typically depends on the first torque to be provided by the first electric machine and the second PWM actuation typically depends on the second torque to be provided by the second electric machine. As explained already above, control instructions for the operation of the electric machine units can be determined (in dependence on the first and second torques) based on characteristic data and/or based on a learned neural network. In particular, the control instructions may indicate the first and second PWM actuation. In this way, the target vibrations (at the common housing or at the connected housing) can be effected in a particularly reliable manner.

A first electromagnetic radiation (i.e., first (electromagnetic) vibrations) can be effected by the first PWM actuation of switching elements of the first inverter. Further, a second electromagnetic radiation (i.e., second (electromagnetic) vibrations) may be effected by the second PWM actuation of switching elements of the second inverter. The electromagnetic radiation may have electromagnetic compatibility (EMC) effects on the electric machine units and/or the vehicle.

The device can be set up to synchronize the first PWM actuation and the second PWM actuation in such a way that the first electromagnetic radiation and the second electromagnetic radiation at least partially cancel each other out. Thus, operation of the electric machine units can be synchronized in such a way that the total electromagnetic radiation (i.e., the (electromagnetic) target vibrations) radiated by the electric machine units (in particular, by the inverters) is lower (in particular, has a lower intensity) than the electromagnetic radiation (i.e., the first and the second vibrations, respectively) radiated separately by each of the electric machine units. Thus, the EMC compatibility of the electric machine units can be improved in an efficient and reliable manner.

The device can be set up to determine sensor data relating to vibrations of the common housing of the first electric machine unit and the second electric machine unit. As discussed already above, the target vibrations may relate to the vibrations of the common housing.

The first electric machine unit and the second electric machine unit can then be operated (in a coordinated manner) in dependence on the sensor data in order to effect the target vibrations of the common housing. In particular, the operation of the electric machine units can be controlled on the basis of the (fed-back) sensor data in order to cause the housing to have the target vibrations. By taking sensor data into account with respect to the actually generated vibrations, the target vibrations can be brought about with particularly high reliability and robustness.

According to a further aspect, a (road) motor vehicle (in particular a passenger car or a truck or a bus or a motorcycle) comprising the device described in this document is described.

According to a further aspect, a method for controlling the vibrations effected by electric machine units of a vehicle is described. The method may be directed to reduce the magnitude, in particular the amplitude and/or the intensity, of the effected vibrations (compared to the vibrations produced by the individual machine units in an isolated manner). Alternatively or additionally, the method may be directed to effect a specific target design of the vibrations (for example, to generate specific driving sounds of the vehicle).

The vehicle comprises a first electric machine unit for driving a first wheel and a second electric machine unit for driving a second wheel of the vehicle. The first electric machine unit can be operated in dependence on a first torque to be applied at the first wheel, and the second electric machine unit can be operated in dependence on the second torque to be applied to the second wheel. The electric machine units can thus be operated to drive the vehicle, in particular to drive different wheels of the vehicle.

The method comprises operating the first electric machine unit and the second electric machine unit (while the vehicle is in motion, i.e., while the machine units are being used to drive the vehicle) in synchronization with respect to each other and/or in a coordinated manner so as to effect predefined target vibrations by superimposing first vibrations caused by the operation of the first electric machine unit and second vibrations caused by the operation of the second electric machine unit.

The target vibrations can indicate here,
 a (desired and/or predefined) amplitude and/or intensity of the actually effected vibrations;
 a (desired and/or predefined) frequency of the actually effected vibrations; and/or
 a (desired and/or predefined) temporal course of the amplitude and/or frequency of the actually effected vibrations.

According to a further aspect, a software (SW) program is described. The SW program can be set up to be executed on a processor (for example, on an ECU of a vehicle), and thereby to perform the method described in the present document.

According to a further aspect, a storage medium is described. The storage medium may comprise an SW program set up to be executed on a processor and thereby to perform at least the method described in this document.

It should be noted that the methods, devices, and systems described in this document can be used alone or in combination with other methods, devices, and systems described in this document. Furthermore, any aspects of the methods, devices, and systems described in this document can be combined in a variety of ways. In particular, the features of the claims can be combined in a variety of ways.

The invention is described in greater detail below with reference to exemplary embodiments.

DETAILED DESCRIPTION OF THE DRAWINGS

Figure 1A:
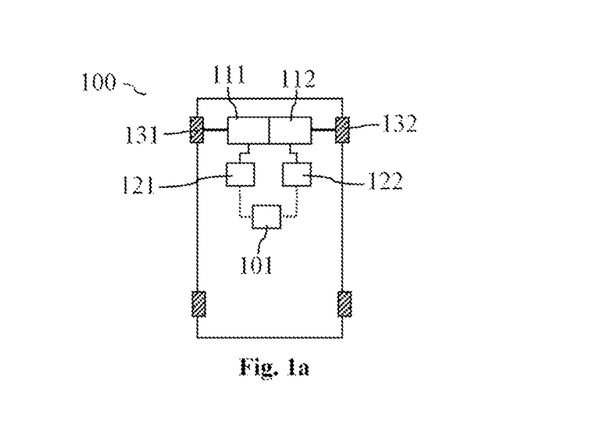
FIG. 1a shows an exemplary vehicle with two electric machine units.

As stated at the outset, the present document deals with the efficient and reliable adjustment (in particular reduction) of vibrations in a system comprising at least two electric machines. In this context, FIG. 1a shows a vehicle 100 as an example of a system, wherein the vehicle 100 comprises a first electric machine 111 (for driving a first wheel 131 of the vehicle 100) and a second electric machine 112 (for driving a second wheel 132 of the vehicle 100). The first electric machine 111 and the second electric machine 112 can be mechanically coupled to each other here, for example via a common housing. The aspects described in this document for a vehicle 100 are generally applicable to a system comprising at least two electric machines 111, 112.

The vehicle 100 (generally, the system) further comprises a first inverter 121 for the first electric machine 111 and a second inverter 122 for the second electric machine 112. Here, the first inverter 121 and the second inverter 122 can be implemented on a common circuit board, if appropriate. The combination of an inverter 121, 122 and the electric machine 111, 112 associated therewith is also referred to as an electric machine unit in this document.

A (control) device 101 of the vehicle 100 (for example, as part of at least one inverter 121, 122) can be set up to operate the first electric machine unit 111, 121 in order to drive the first wheel 131 of the vehicle 100 (or, as the case may be, to effect a braking torque at the first wheel 131), and/or to operate the second electric machine unit 112, 122 in order to drive the second wheel 132 of the vehicle 100 (or, as the case may be, to effect a braking torque at the second wheel 132). Thus, different wheels 131, 132 (for example, a right wheel and a left wheel) can be driven in an efficient and precise manner.

Figure 1B:
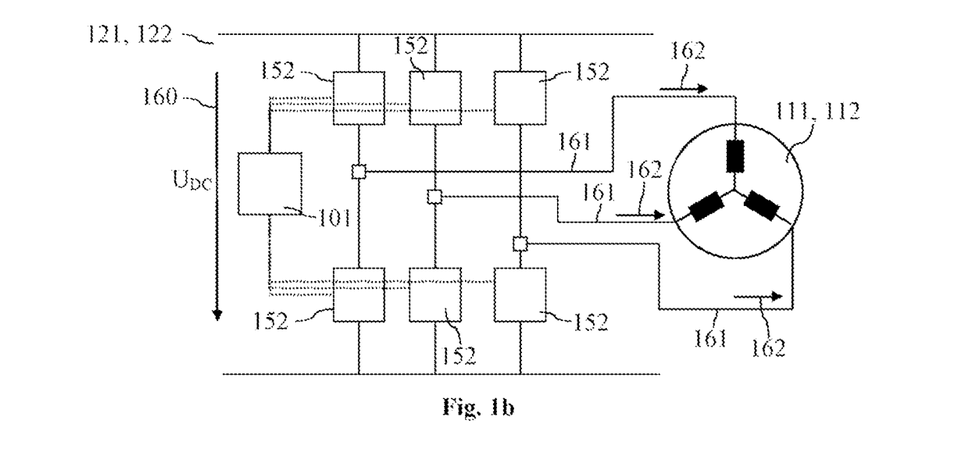
FIG. 1b shows an exemplary inverter for an electric drive machine of a vehicle.

FIG. 1b shows an exemplary inverter 121, 122, which is set up to generate phase voltages 161 (i.e., AC voltages) for the different coils of an electric drive machine 111, 112 on the basis of a vehicle electrical supply voltage $U_{DC}$ 160 (i.e., a DC voltage). FIG. 1b shows an example of the generation of a three-phase voltage or a three-phase current. The aspects described in this document are generally applicable to multi-phase (for example, including six-phase) machines 111, 122.

The inverter 150 (or power inverter) comprises a plurality of switches or switching elements 152, each of which is arranged in a half-bridge for each phase in the example shown. The switching elements 152 are actuated by a (control) device 101 to generate the phase voltages 161 for the electric machine 111, 112, in particular for the stator of the electric machine 111, 112.

Figure 1C:
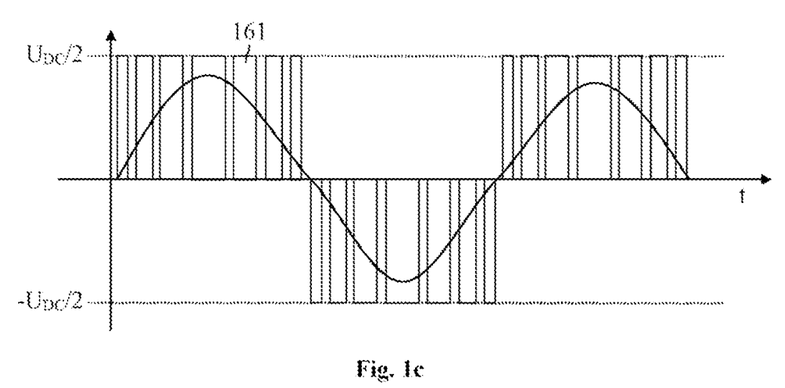
FIG. 1c shows an example of a phase voltage curve.

FIG. 1c shows an exemplary phase voltage 161 that can be generated by the switching elements 152 of a half-bridge. As can be seen from FIG. 1c, the switching elements 152 are switched (i.e., opened or closed) with a certain pulse pattern, i.e., with a PMW (pulse width modulated) actuation, in order to generate a (sinusoidal) AC voltage 161. The pulse pattern for a specific (static) operating point of the electric machine 111, 112 (for example for a target torque to be applied) can be determined in advance, for example by way of an optimization method such as SOPWM (Synchronous optimal pulse width modulation), by which a specific optimization criterion (for example the harmonic distortion of the phase currents 162) can be optimized, in particular minimized. The determined pulse patterns for different operating points (for example for different target torques) of the electric machine 111, 112 can be stored, for example in a look-up table (LUT) and/or in characteristic data. In this case, the individual pulse patterns each have a certain number N of pulses for each wave or half-wave of the AC voltage 161 to be generated, wherein N is an integer (for example, N=1, 2, 3, 4, 5, 6 or more). The different operating points of the electric machine 111, 112 may, for example, have different torques to be set and/or different rotational speeds.

The control unit or device 101 can be set up to control the phase currents 162, for example to cause the electric machine 111, 112 to provide a specific (possibly constant) target torque.

An electric machine 111, 112 typically causes vibrations in the perceptible and/or audible frequency range during operation. Furthermore, the switching elements 152 of an inverter 121, 122 also typically cause background noise and/or electromagnetic radiation during the switching operations. These (perceptible and/or audible) vibrations may be perceived as unpleasant by a user of a vehicle 100 and/or by the environment of a vehicle 100. Furthermore, the electromagnetic radiation effected may lead to EMC problems.

By way of active noise cancelling (ANC), background noise can be at least partially compensated. The background noise can be detected by one or more microphones, and a compensation sound, which is designed to at least partially cancel out the noise, can be output via one or more loudspeakers. However, the use of ANC requires the additional installation of loudspeakers in a vehicle 100.

The device 101 can be set up to synchronize the operation of the first machine unit 111, 121 with the operation of the second machine unit 112, 122 in such a way that the vibrations (in particular background noise) generated by the first machine unit 111, 121 are coordinated with the vibrations (in particular background noise) generated by the second machine unit 112, 122, for example in order to effect a specific combined vibration (in particular a specific combined noise) and/or in order to cause the generated vibrations (in particular background noise) to at least partially cancel each other out.

For example, the device 101 can be set up to operate the first machine unit 111, 121 in phase opposition to the second machine unit 112, 122, in particular to cause the vibrations effected by the particular machine unit 111, 121, 112, 122 to be in phase opposition to each other and at least partially cancel each other out.

Figure 2:
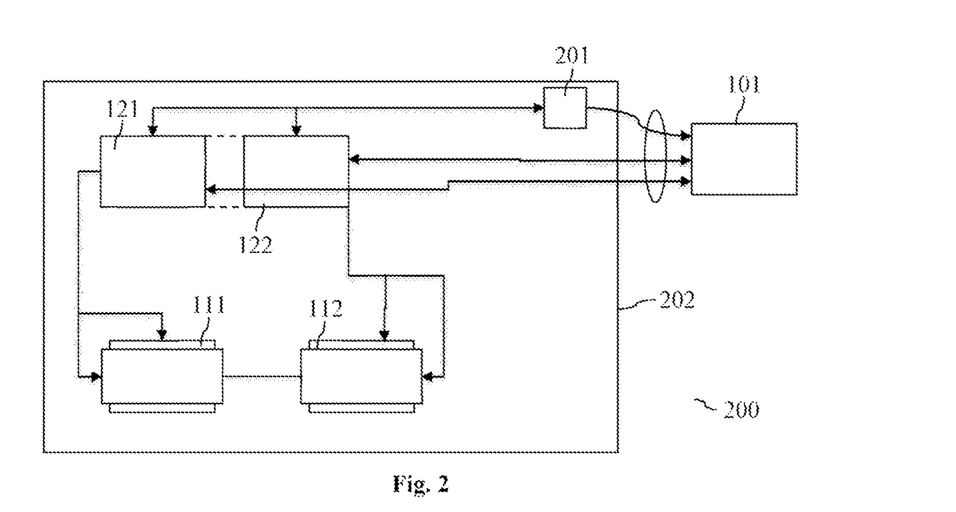
FIG. 2 shows an exemplary system with two electric machine units.

FIG. 2 shows an exemplary system 200 comprising (for example, in a common housing 202) a first machine unit 111, 121 (comprising a first electric machine 111 and a first inverter 121) and a second machine unit 112, 122 (comprising a second electric machine 112 and a second inverter 122). The (control) device 101 can be integrated in the housing 202 or can be arranged outside the housing 202. The system 200 can further comprise one or more sensors 201 set up to detect sensor data relating to vibrations (in particular background noise, vibrations and/or electromagnetic radiation) of the system 200.

The device 101 can be set up to operate the first inverter 121 and the second inverter 122 in such a way that the phase voltages 161 generated by the two inverters 121, 122 have a certain relationship (for example an opposite phase relationship) relative to each other. This can be brought about by a suitable PWM actuation of the individual switching elements 152 of the inverters 121, 122. By mutually synchronizing the phase voltages 161 for the different electric machines 111, 112, the vibrations caused by the different electric machines 111, 112 in each case can be matched to one another, in particular to bring about at least partial compensation of the vibrations.

The PWM actuation for the switching elements 152 of the inverters 121, 122 can be determined in advance for a plurality of different operating points of the electric machine units 111, 112, 121, 122 in each case using an optimization method (for example SOPWM), as explained above. An operating point may comprise the first torque to be applied by the first electric machine 111 and the second torque to be applied by the second electric machine 112. Thus, a PWM actuation for the inverters 121, 122 can be determined in advance for different combinations of torques to be applied and stored as characteristic data. When determining the PWM actuation, the combined target vibrations to be effected in each case can be included as part of the optimization criterion.

Thus, a system 200 is described which is configured to destructively use the excitations occurring in both electric machines 111, 112 in a defined manner to reduce the magnitude of the vibrations of the system 200.

The clock frequency of the PWM actuation of an electric machine 111, 112 is typically a major cause of the electrical losses of the power inverter or inverter 121, 122, of the EMC (electromagnetic compatibility) radiation and/or of the acoustic airborne radiation of the housing 202 of the electric machine 111, 121.

Via the actuation of at least two electric motors 111, 112 (mechanically) coupled to one another it is possible to suppress the background noise and/or to provide additional functions for an active sound design. By way of the PWM actuation in phase opposition, the individual clock frequency can be reduced (without disadvantages regarding the electromagnetic and/or acoustic radiation), since the electromagnetic and/or acoustic radiation between the electric machines 111, 112 can be compensated. By reducing the clock frequency, the switching losses of the switching elements 152 can be reduced and thus the efficiency of the overall system 200 can be increased.

By using a vibration sensor 201, the acoustic excitation of the overall system 200 can be detected. The operation of the electric machine units 111, 121, 112, 122 can then be adjusted in dependence on the sensor data of the vibration sensor 201 in such a way that the acoustic excitation of the overall system 200 is reduced. Alternatively or additionally, a reduction in EMC emissions can be achieved by the use of purposefully opposite-phase PWM actuation for the inverters 121, 122. Furthermore, the electrical efficiency of the overall system 200 can be increased.

Figure 3:
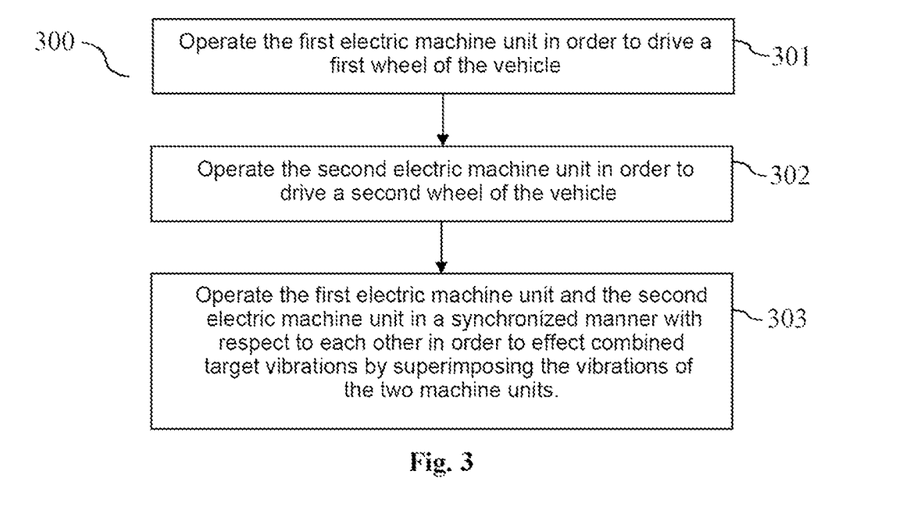
FIG. 3 shows a flow chart of an exemplary method for active control of vibrations.

FIG. 3 shows a flow chart of an exemplary (possibly computer-implemented) method 300 for controlling vibrations (in particular acoustic vibrations and/or background noise) effected by electric machine units 111, 121, 112, 122 of a vehicle 100. The vehicle 100 comprises a first electric machine unit 111, 121 for driving a first wheel 131 (for example, the left wheel 131 of the front or rear axle of the vehicle 100) and a second electric machine unit 112, 122 for driving a second wheel 132 (for example, the right wheel of the front or rear axle of the vehicle 100).

The method 300 comprises operating 301 the first electric machine unit 111, 121 in dependence on the first torque to be applied at the first wheel 131. The method 300 further comprises operating 302 the second electric machine unit 112, 122 in dependence on the second torque to be applied at the second wheel 132.

The torque to be applied at the particular wheel 131, 132 can be determined on the basis of the position of the accelerator pedal and/or the brake pedal of the vehicle 100. Furthermore, the steering angle of the vehicle 100 may be taken into account when determining the torques. Furthermore, the specification of a vehicle stabilization system of the vehicle 100 may be taken into account when determining the torque to be applied at the first and/or second wheel 131, 132.

The electric machine units 111, 121, 112, 122 may thus be operated to drive the vehicle 100. In this context, the electric machine units 111, 121, 112, 122 may be mechanically coupled to one another, so that vibrations generated during the operation of the particular electric machine unit 111, 121, 112, 122 may influence one another (and in particular add to one another or at least partially compensate for or cancel one another out). The electric machine units 111, 121, 112, 122, in particular the stators of the electric machines 111, 112, may contact each other. Furthermore, the electric machine units 111, 121, 112, 122 may be arranged in a common housing 202.

The method 300 further comprises operating 303 the first electric machine unit 111, 121 and the second electric machine unit 112, 122 in such a synchronized and/or coordinated manner to effect predefined target vibrations by superimposing the first vibrations caused by operation of the first electric machine unit 111, 121 and the second vibrations caused by operation of the second electric machine unit 112, 122.

In this regard, the operating step 303 is typically part of the operating steps 301 and/or 302. In other words, the coordinated and/or synchronized operation of the electric machine units 111, 121, 112, 122 is typically performed as part of the operation of the individual electric machine units 111, 121, 112, 122 for providing a (first and/or second) torque at the particular wheel 131, 132.

For example, the target vibrations may correspond to a particular target noise. The synchronized operation of the electric machine units 111, 121, 112, 122 (when the vehicle 100 is moving) may thus be used to generate a particular driving noise. Alternatively or additionally, the target vibrations may have an amplitude and/or intensity that is smaller than the amplitude and/or intensity of the first vibrations and/or the second vibrations. Thus, a targeted vibration reduction and in particular noise reduction can be effected by the synchronized operation of the electric machine units 111, 121, 112, 122 (during travel of the vehicle 100) in order to increase the driving comfort of the vehicle 100 in an efficient manner.

The present invention is not limited to the exemplary embodiments presented. In particular, it should be noted that the description and the figures are intended to illustrate the principle of the proposed methods, devices and systems merely by way of example.

The invention claimed is:

1. A device for controlling vibrations effected by electric machine units of a vehicle, wherein the vehicle comprises a first electric machine unit for driving a first wheel of the vehicle and a second electric machine unit for driving a second wheel of the vehicle, wherein the device is configured:
to operate the first electric machine unit in dependence on a first torque to be applied at the first wheel;
to operate the second electric machine unit in dependence on a second torque to be applied at the second wheel;
to operate the first electric machine unit and the second electric machine unit in a synchronized manner with respect to each other such that predefined target vibrations are effected by superimposing first vibrations caused by operation of the first electric machine unit and second vibrations caused by operation of the second electric machine unit; and
to operate the first electric machine unit and the second electric machine unit in dependence on at least one of characteristic data or a machine-learned unit,
wherein the at least one of the characteristic data or the machine-learned unit is configured to determine, in dependence on the first torque and the second torque, control instructions for the first electric machine unit and for the second electric machine unit, operation of the first electric machine unit and of the second electric machine unit with the target vibrations being effected by the control instructions.

2. The device according to claim 1, wherein the device is further configured to operate the first electric machine unit and the second electric machine unit in the synchronized manner with respect to each other such that at least one of:
the predetermined target vibrations are effected which have a lower intensity and/or amplitude than the first vibrations and the second vibrations;
the first vibrations and the second vibrations at least partially cancel each other out; or
the first vibrations and the second vibrations are at least partially in phase opposition to each other.

3. The device according to claim 1, wherein the device is further configured to operate the first electric machine unit and the second electric machine unit in the synchronized manner with respect to each other such that synchronized operation of the first electric machine unit and of the second electric machine unit effects an active noise suppression of background noise that is effected by the first electric machine unit and by the second electric machine unit.

4. The device according to claim 1, wherein the device is further configured to operate the first electric machine unit and the second electric machine unit with a defined phase shift with respect to each other in a defined manner to effect the target vibrations.

5. The device according to claim 1, wherein the device is further configured to operate the first electric machine unit and the second electric machine unit with a defined phase shift with respect to each other in phase opposition to effect the target vibrations.

6. The device according to claim 1, wherein:
the first electric machine unit comprises a first electric machine and a first inverter which is configured to generate first AC voltages for operation of the first electric machine;
the second electric machine unit comprises a second electric machine and a second inverter which is configured to generate second AC voltages for operation of the second electric machine; and
the device is further configured to operate the first inverter and the second inverter in a manner synchronized with respect to each other such that the target vibrations are effected.

7. The device according to claim 6, wherein the device is further configured:
to effect a first PWM actuation of switching elements of the first inverter to generate the first AC voltages;
to effect a second PWM actuation of switching elements of the second inverter to generate the second AC voltages; and
to synchronize the first PWM actuation and the second PWM actuation with respect to each other such that the target vibrations are effected.

8. The device according to claim 7, wherein:
a first electromagnetic radiation is effected by the first PWM actuation of switching elements of the first inverter;
a second electromagnetic radiation is effected by the second PWM actuation of switching elements of the second inverter; and
the device is further configured to synchronize the first PWM actuation and the second PWM actuation such that the first electromagnetic radiation and the second electromagnetic radiation at least partially cancel each other out.

9. The device according to claim 1, wherein the device is further configured:
to determine sensor data relating to vibrations of a common housing of the first electric machine unit and the second electric machine unit; wherein the target vibrations relate to the vibrations of the common housing; and
to operate the first electric machine unit and the second electric machine unit in dependence on the sensor data in order to effect the target vibrations of the common housing.

10. The device according to claim 1, wherein the machine-learned unit is a learned neural network.

11. A method for controlling vibrations effected by electric machine units of a vehicle, wherein the vehicle comprises a first electric machine unit for driving a first wheel of the vehicle and a second electric machine unit for driving a second wheel of the vehicle, the method comprising:
operating the first electric machine unit in dependence on a first torque to be applied at the first wheel;
operating the second electric machine unit in dependence on a second torque to be applied at the second wheel;
operating the first electric machine unit and the second electric machine unit in synchronization with respect to each other so as to effect predefined target vibrations by superimposing first vibrations caused by operation of the first electric machine unit and second vibrations caused by operation of the second electric machine unit; and
operating the first electric machine unit and the second electric machine unit in dependence on at least one of characteristic data or a machine-learned unit,
wherein the at least one of the characteristic data or the machine-learned unit is configured to determine, in dependence on the first torque and the second torque, control instructions for the first electric machine unit and for the second electric machine unit, operation of the first electric machine unit and of the second electric machine unit with the target vibrations being effected by the control instructions.

* * * * *